United States Patent Office
3,520,042
Patented July 14, 1970

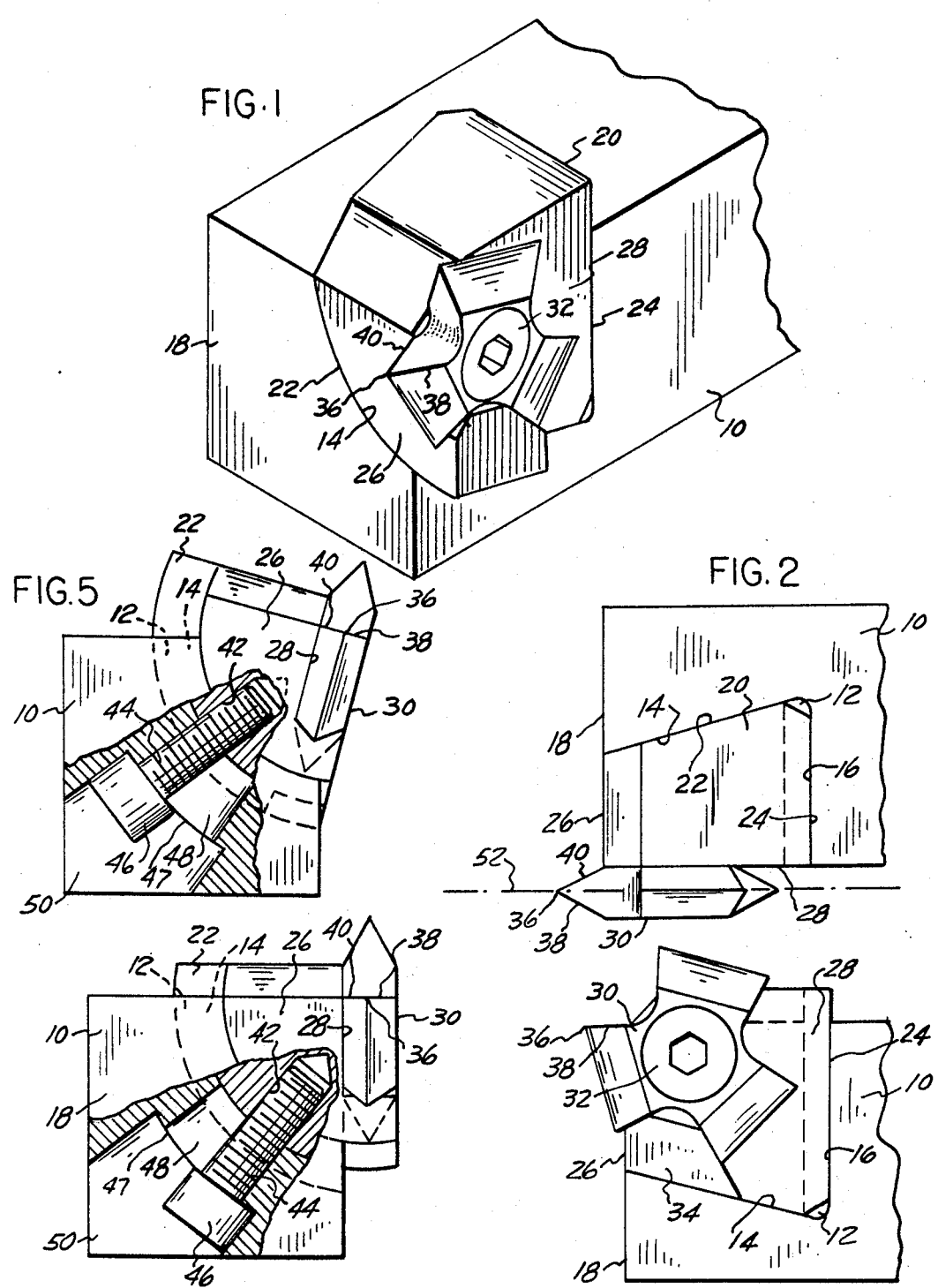

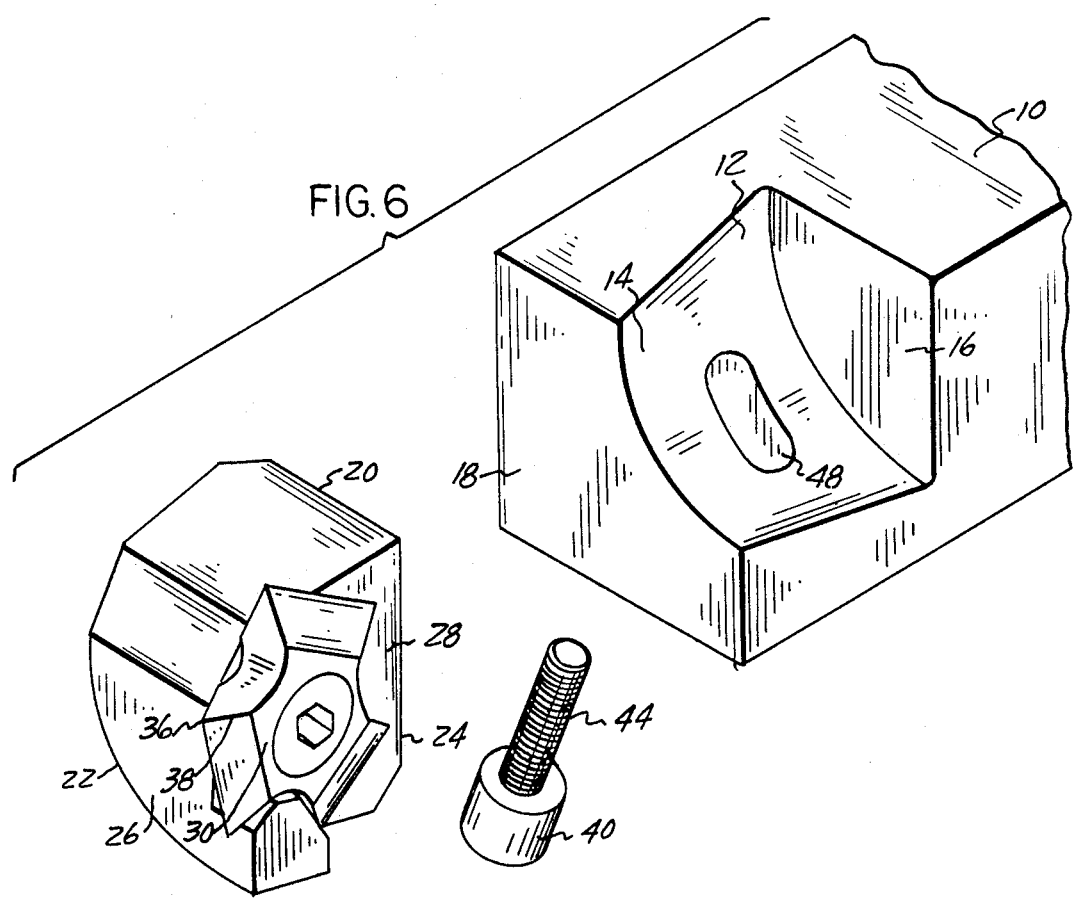
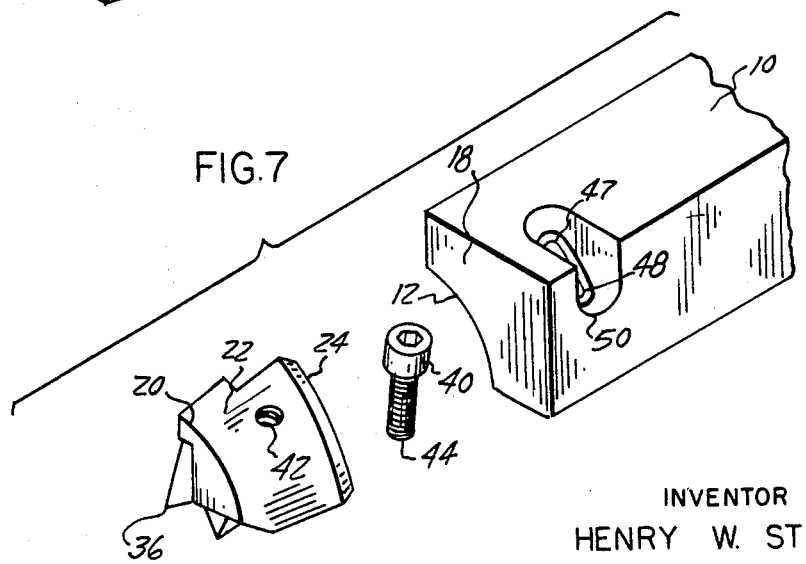

3,520,042
ADJUSTABLE THREADING TOOL
Henry W. Stier, Dearborn Heights, Mich., assignor to Carmet Company, Pittsburgh, Pa., a corporation of New Jersey
Filed Oct. 11, 1967, Ser. No. 674,628
Int. Cl. B26d 1/00
U.S. Cl. 29—98
6 Claims

ABSTRACT OF THE DISCLOSURE

A tool holder for indexable and reversible threading insert of the type consisting of a polygon having a plurality of radially extending cutting edges, the tool holder comprising a shank having a partially conical recess in one end and a clampable partially conical block, adapted to support the cutting insert, disposed in such recess. The angular position of the conical block is adjustable relatively to the shank.

CROSS-REFERENCE TO RELATED APPLICATIONS

The present application relates to an adjustable tool holder for an indexable and reversible threading or grooving insert such as is disclosed and claimed in co-pending application Ser. No. 648,677, filed June 26, 1967 for threading insert.

BACKGROUND OF THE INVENTION

Single point thread cutting tools are principally used for short run production of externally threaded cylindrical elongated workpieces, or for cutting multiple start threads on the periphery of a cylindrical elongated workpiece. Single point threading tools often use a cutting insert made of tool steel, or preferably made of carbide and the like, which is held in an appropriate insert holder. The cutting insert disclosed in the aforesaid co-pending application is particularly convenient, when disposed in an appropriate holder, for single point thread cutting. Such cutting insert is generally in the shape of a polygon with alternate peripheral edges removed so as to provide radial projections each with two cutting edges. Such an insert is normally clamped to a side face of a tool holder, and generally provides appropriate side clearances when cutting a deep V or a shallow V thread on the periphery of a rotating cylindrical elongated workpiece. However, when it is desired to cut a thread having a large helix angle, as is the case when cutting multiple start threads, in order to provide appropriate side clearances for the cutting edge of the insert, it becomes desirable to incline the cutting insert in such a manner that the plane of symmetry of the insert is disposed substantially at the same angle as the angle of the thread being cut.

SUMMARY OF THE INVENTION

The present invention accomplishes the desirable objects enumerated above by providing a support means for the cutting insert which may be angularly adjustable so as to provide perfect alignment between the plane of symmetry of the cutting insert and the helix angle of the thread being cut. This is accomplished by providing a conventional parallelepipedonal tool holder with a partial cylindrical, and preferably conical, recess on the end thereof proximate the workpiece, and by disposing in the recess a partially cylindrical, or preferably conical, complementary block supporting the insert, such that the block may be adjusted to any adequate angular position corresponding to the helix angle of the thread being cut, and clamped in such position.

BRIEF DESCRIPTION OF THE DRAWINGS

FIG. 1 is a partial perspective view of a tool holder according to the present invention;
FIG. 2 is a top plan view thereof;
FIG. 3 is a side elevation thereof;
FIG. 4 is a front elevational view thereof, with portions broken away to show the internal construction;
FIG. 5 is a view similar to FIG. 4 but showing the holder adjusted so as to incline the cutting insert;
FIG. 6 is a partial perspective exploded view of the tool holder of the invention; and
FIG. 7 is a view similar to FIG. 6 but showing the principal elements forming the tool holder of the present invention under a different perspective.

DESCRIPTION OF A PREFERRED EMBODIMENT

Referring now to the drawings, an adjustable threading tool holder according to the present invention comprises a rigid bar of steel or the like material forming a parallelepipedonic shank 10 having, on one end thereof, a removed portion defining a recess 12, best seen in FIG. 6, which substantially corresponds to one quadrant, or one-fourth, of a frustrum of a cone. The recess 12 has a concave generally longitudinal conical partial sidewall 14 open to the top face and to one side face of the shank 10, and a transverse planar back wall 16, corresponding to the base of the partial cone removed from the shank 10 to form the recess. The apex of the cone is beyond the front face 18 of the shank 10. A matching partially conical insert or block 20 is disposed in the recess 12, such block 20 having a convex partially conical face 22 engaging the concave conical side wall 14 of the recess and a planar back face 24 normally engaging the planar back wall 16 of the recess 18. The insert or conical block 20 has a forward face 26 at least substantially in the plane of the shank forward face 18 or slightly projecting with respect thereof.

To the side face 28 of the insert or conical block 20 is attached a polygonal thread cutting insert 30 by means of a centrally located set screw 32, the cutting insert 30 being adequately positioined and indexed by means of indexing block 34 affixed to, or integral with, the side face 28 of conical block 20, as shown in the drawings and as described in more details in co-pending application Ser. No. 648,677. The cutting insert 30 thus presents to the workpiece, not shown, a cutting point 36 and two cutting edges 38 and 40.

A threaded radial bore 42, best shown in FIGS. 4–5 and 7, is disposed in conical block 20 for accepting a bolt 44 having a head 46 normally engaging the edge 47 of a slot 48 disposed in the shank 10 in angular alignment with radial threaded bore 42 in the conical block 20. A counter sunk 50 is formed in the shank 10 so as to provide access to the bolt head 46 which is thus sunk in the mass of the shank. It can thus be seen that the partially conical block 20 is angularly adjustable from the position shown in FIG. 4 whereby the side face 28 of the block is substantially parallel or flush with the side face of the shank 10 to a position, as illustrated in FIG. 5, wherein the plane of the side face 28 of the conical block 20 forms an angle with the plane of the side face of the shank.

At those extreme positions, as well as at any other intermediate position, tightening of bolt 46 draws block 20 within the recess 12 such that the convex conical face 22 of the block is drawn against the concave conical side wall 14 of recess 12, while the planar back face 24 of the block is drawn securely against the planar backwall 16 of the recess 12.

The imaginary centerline of the cone, as pictured by dash and dot line 52 in FIG. 2, passes through the cutting point 36 of the cutting insert 30 in such manner that the cutting point always remains at the same height, irrespective of the angular adjustment of the conical block 20 and consequently of the cutting insert 30, such angular adjustment being the one required for inclining the plane of symmetry of the cutting insert to the appropriate helix angle of the thread being cut.

It is readily apparent that recess 12 may be partially cylindrical in shape, i.e. provided with a sidewall shaped as a concave surface of revolution longitudinally oriented parallel to the axis of the shank and a transverse backwall normal to such axis. The cutting insert supporting block is also partially cylindrical and the axis of the bolt fastening the block within the recess is preferably inclined with respect to a radius of the cylinder such that, when the bolt is tightened, the block is drawn rearwardly with its back face firmly engaging the back wall of the recess for correct longitudinal partitioning of the cutting insert cutting point.

It will be obvious to those skilled in the art that various changes in the details and the arrangement of element having herein been described and illustrated in order to explain the nature of the invention may be made without departing from the principle and scope of the invention as expressed in the appended claims.

I claim:
1. An adjustable holder for a thread cutting insert having at least one cutting point, said holder comprising:
   a shank;
   a recess in the form of a partial cone in one end of said shank, said recess defining a conical sidewall and a transverse planar backwall;
   a mating partially conical block disposed in said recess, said mating block having a conical side face and a planar back face;
   means for mounting said cutting insert on said block;
   means for adjustably angularly positioning said block in said recess relatively to said shank by limited rotation of said block around the centerline of said cone; and
   means for clamping said block in said recess by drawing said conical side face in engagement with said conical side wall and said planar back face in engagement with said planar back wall.

2. The holder of claim 1 wherein said centerline passes through the cutting point of said cutting insert.

3. The holder of claim 2 wherein said means for clamping said block comprises a bolt threading in a radial threaded bore in said block and passing through an elongated slot in said shank longitudinally and radially aligned with said threaded bore.

4. The holder of claim 3 further comprising a countersink for said slot wherein said bolt is prevented from projecting from said shank.

5. An adjustable holder for thread cutting insert comprising:
   a shank;
   a recess in one end of said shank, said recess defining a side wall shaped as a concave surface of revolution having an axis substantially parallel to said shank and a transverse planar back wall;
   a mating block disposed in said recess, said mating block having a side face shaped as a convex surface of revolution and a planar back face;
   means for mounting said cutting insert on said block;
   means for adjustably, angularly positioning said block relative to said shank by limited rotation thereof around the centerline of said surface of revolution; and
   means for clamping said block in a predetermined position relative to said shank wherein said clamping means includes means drawing said convex face toward said concave sidewall and said planar block face toward said planar back wall.

6. Apparatus according to claim 5 wherein said axis of revolution passes through a cutting point of said cutting insert and said means for clamping said block includes a bolt threading in a bore in said block inclined with respect to the radius of said cylinder and passing through an elongated slot in said shank aligned with said bore whereby said block will be drawn rearwardly engaging said back wall and toward said side wall.

References Cited

UNITED STATES PATENTS

| | | | |
|---|---|---|---|
| 2,346,084 | 4/1944 | Sanocki | 29—98 |
| 2,458,244 | 1/1949 | Bohl | 29—98 |
| 2,808,638 | 10/1957 | Filippi | 29—96 |
| 2,962,800 | 12/1960 | Swenson | 29—98 |
| 3,125,798 | 3/1964 | Stein | 29—98 |

FOREIGN PATENTS

| | | |
|---|---|---|
| 904,081 | 2/1944 | France. |
| 922,833 | 1/1946 | France. |

HARRISON L. HINSON, Primary Examiner

U.S. Cl. X.R.

29—96